March 2, 1954  E. C. MOSBY  2,670,498
STRIPPING MACHINE FOR SAUSAGE CASINGS AND THE LIKE
Filed Oct. 16, 1951  4 Sheets-Sheet 1

FIG. I

INVENTOR.
Elbridge C. Mosby
BY
Attorney

March 2, 1954   E. C. MOSBY   2,670,498
STRIPPING MACHINE FOR SAUSAGE CASINGS AND THE LIKE
Filed Oct. 16, 1951   4 Sheets-Sheet 2

INVENTOR.
Elbridge C. Mosby
BY
Attorney

March 2, 1954  E. C. MOSBY  2,670,498
STRIPPING MACHINE FOR SAUSAGE CASINGS AND THE LIKE
Filed Oct. 16, 1951  4 Sheets-Sheet 3

INVENTOR.
Elbridge C. Mosby
BY
Attorney

Patented Mar. 2, 1954

2,670,498

UNITED STATES PATENT OFFICE 2,670,498

STRIPPING MACHINE FOR SAUSAGE CASINGS AND THE LIKE

Elbridge C. Mosby, Chicago, Ill., assignor of twenty-five per cent to David Manly Heller, Skokie, Ill.

Application October 16, 1951, Serial No. 251,484

18 Claims. (Cl. 17—1)

My invention relates to automatic means for stripping or removing the outer casings from frankfurters, sausages and the like.

At present frankfurters are manufactured in a stuffing machine which feeds the chopped meat into animal casings, or artificial casings made of synthetic material, so as to enable the same to be linked to proper lengths to four frankfurters, the stuffer and the linker producing a multiplicity of interconnected frankfurters which are to be severed, preparatory to having the casings stripped therefrom.

An important object of my invention is to provide automatic means for the accomplishment of the aforementioned removal or stripping of the outer casings enveloping the frankfurter, necessitated by the processing thereof and the cooking and smoking operations.

A further object of my invention is to provide a mechanism of the aforementioned character which will permit an operator to feed therethrough lengths of sausage casings stuffed with frankfurter filler material and linked to frankfurter measurements, so that the same may be passed automatically through the machine or mechanism comprising my invention, the same to be severed and stripped, ultimately releasing from the mechanism frankfurters which are free of their enclosure in which they were confined in the processing operation, known in the trade as "skinless" frankfurters.

A further object of my invention is to provide feed rolls made of resilient material and having "V-shaped" cross-sectional peripheral configuration, being subdivided by slotted portions into a number of sections which will permit greater compressibility so as to insure gripping traction thereof when engaging the frankfurter assembly passing therebetween.

A still further object of my invention is to provide resilient stripper means of cylindrical configuration having "V-shaped" cross-sectional peripheral feeding channels, the same also being subdivided into a number of resilient sections by means of slotted portions throughout the peripheral portions thereof so as to afford efficient traction for gripping and feeding frankfurters therethrough, simultaneously stripping the casings therefrom; the said stripper means being connected to valve means having ports connected to the exhaust and intake pumping means so that during the cycle of rotation of the said stripper means both suction and pressure will be applied alternately to the casing to be stripped, in order that the same may be caused by means of suction to adhere to the stripping means and stripped off the frankfurter, yet in the further progress of the cycle, by air pressure forced through the ports therein effectuate relief of the stripped portion of the casing and discard the same.

It is another object of my invention to provide a mechanism of the aforementioned character in which a series of feed rolls will feed the links consisting of a multiplicity of frankfurters so that the casing thereof may be bisected by cutting knife means disposed floatably and in superimposition so that they will be guided by the configuration of the frankfurters passing therebetween, and a frankfurter severing station consisting of novel guillotine means for severing the binding and the twisted portion of the casing so as to effectuate separation of each individual frankfurter, the said cutting knife means and the said guillotine means being synchronized electrically and positioned at a magnitude which is equivalent to one or a multiple of the unit magnitude of a single frankfurter, the two said means, namely the stripping means and the guillotine means being electrically connected to be actuated simultaneously in unison when the restricted portion of the frankfurter reaches the guillotine.

A still further object of my invention is to provide a method of stripping stuffed and linked frankfurter casings therefrom, by first bisecting the casing enveloping each individual frankfurter, subsequently separating each frankfurter whose casing has been thus bisected, and thirdly removing the bisected casing portions from the frankfurter, discarding the same and feeding the frankfurter stripped, completing the cyclical operation.

A further object of my invention is to provide a mechanism of the aforementioned character which will operate in conformance with the illustrations suggesting the operation.

A still further object of my invention is to provide a method of removing the casing from frankfurters and the like, by bisecting the casing, severing each frankfurter, and removal or stripping of the bisected portions of the casing by suction means.

A further object of my invention is to provide a simple efficient mechanism for stripping casings from frankfurters, which is also economical to manufacture.

Other objects, ancillary features, and advantages inherent in my invention, will be appreciated by those skilled in the art, inasmuch as the accompanying drawings illustrate, and the ensuing description connotes by like characters and numerals, like parts, and in which;

Figure 1:
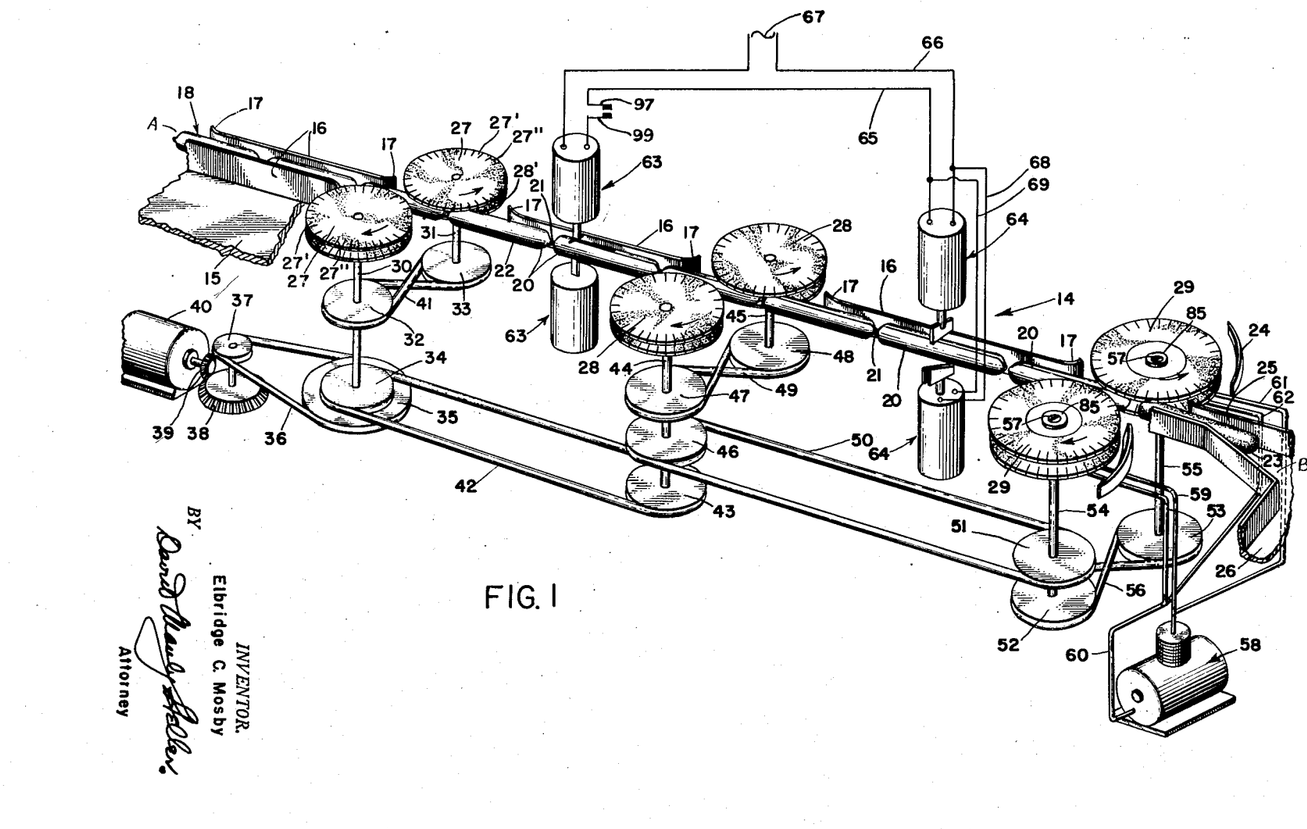
Fig. 1 is a schematic diagrammatic view in perspective showing suggestively the type of mechanism employed to expound the teachings embraced by my invention.
Figure 2:
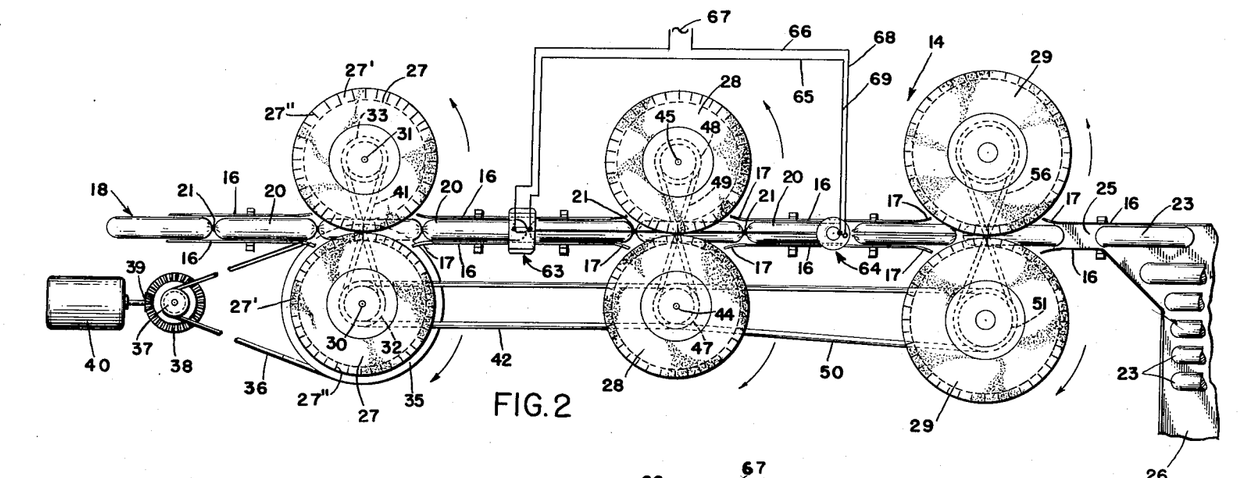
Fig. 2 is a top elevational view of my invention.
Figure 3:
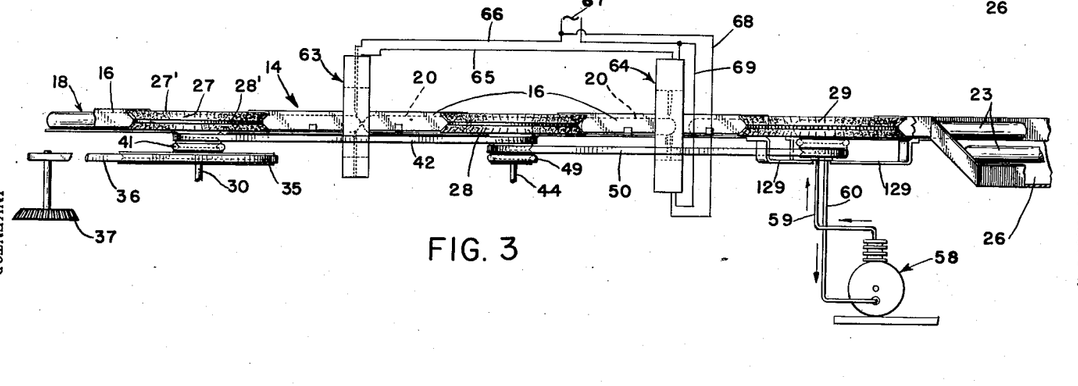
Fig. 3 is a front elevational view of my invention.

Referring to Figs. 1 and 2, my invention is generally designated 14 and consists of a mechanism mounted on a suitable smooth table top 15 to which suitable bearings are provided to house the various shafts and brackets or extensions for supporting a prime mover, the electrical accessories necessary, as well as the transmission and having a rear frankfurter entrance A and a front end B.

It will be noted that a length of processed frankfurters 18 is fed into the stripping machine subsequently to its processing by the frankfurter stuffer and linker, which are machines currently employed in sausage-producing factories, resulting in a subdivision of a number of frankfurters 20, in view of the constriction 21 provided by the linker, which as a rule restricts the spaces between stuffed portions and encircles the same with thread or cord suitably to maintain the formation until the frankfurters are cooked and smoked to make them edible and comestible. The casing 22 on each individual frankfurter is to be stripped especially if it is of the synthetic or artifical type, inasmuch as the present-time commercial requirements prefer frankfurters which are known or designated as "skinless." In order to accomplish this purpose, the lengths of processed frankfurter material 18 are fed through the channel guideways 16 of which there are a number, depending on the length of the proc-essed frankfurter material 18, which are mounted on the table 15, and are each provided with the lips 17, forward and aft, in order not to impede the smooth progress of the frankfurter material 18 therethrough.

Initial feeding rolls 27 are provided which are made up of resilient material such as rubber and are subdivided into a number of sections 27', by virtue of the cutaway portions 27'', in order to permit maximum resiliency and compression of the said rolls, one against the other for efficient traction with the frankfurters, the same also being provided with "V-grooved" portions 28' to effectively feed the frankfurter material 18 therebetween progressively to the intermediate feeding rolls or feeding means 28 which are of similar construction as the feed rolls 27, being also "V-grooved" and sectionally constructed so as to afford maximum pressure resulting in traction with the frankfurters forcing them in the orbit or path indicated.

The frankfurters ultimately reach the stripping means or rolls 29, which are further illustrated in detail in Figs. 4, 5, 6, 7, and 8; the elemental structure thereof will be later described.

The frankfurters 20 are caused to pass a casing splitting station, generally designated 63, provided with floating knives in superimposed relationship which bisect the casing, and which also are provided with roller guide means 106, or physically contacting guide means, riding on the perimetral configuration of the frankfurter processed material 18, so that the said roller guide means will ride on the top surfaces of the frankfurters 20 or drop down into the constriction 21 thereof. The said knives will thus bisect the entire casing inasmuch as there are knives on top and on the bottom, especially since the said knives lie in an imaginary geometric plane positioned equidistantly from the axes of the feed roll means 27 and 28. After the bisection, the intermediate rolls will continue to feed frankfurters confined within the bisected casing which still adheres closely to the frankfurters and cause them to pass the guillotine means, generally designated 64.

The guillotine means has for its purpose to cut away the constriction 21 with its cord wrapping in order to completely dispose of the same so as not to clog the machine in any manner or form. It will be noted that the guillotine means is positioned at a distance equivalent to three times the length of a single frankfurter. Any multiple of a length of a frankfurter may be the position in which the guillotine means may be spaced apart from the casing stripping means, inasmuch as the same is controlled to operate by virtue of the bisecting knife means being forced into the restriction 21 simultaneously closing a circuit in order to instantaneously actuate the guillotine and cut away the restriction linking together adjacent frankfurters.

The bisecting means 63 is connected to a source of electrical supply 67 by virtue of the circuit connections 65, 66 and the guillotine means designated 64, which must operate in concert therewith, are connected in parallel by the circuit connections 68 and 69 as shown.

After the frankfurters are separated, and the casings thereof having been first bisected, they are fed into the stripping means or rolls 29 which by suction grip the initial point of bisected casings and cause the same to be stripped from the frankfurter which is also simultaneously fed by the stripping rolls forward thereof into a reception trough 26, from which it is fed to a banding machine which at the present time is utilized for banding and holding together ten or more frankfurters, the banding material simultaneously bearing the trade-mark or trade name of the manufacturer of the product.

Referring again to Figs. 1 and 2, it will be noted that a prime mover 40 is provided with a driving bevel pinion 39 in mesh with a driven bevel gear 38 to effect the proper reduction of speed of the prime mover 40, the same being connected through a suitable shaft to a driving pulley 37 which is connected to a driven belt pulley 35 by means of a belting 36. The pulley 35 is connected to the shaft 30 on which is mounted one of the initial feeding rolls 27, the other feeding roll 27 being mounted on another shaft 31, the shafts 30 and 31 being motivated by pulleys 32 and 33 respectively, interconnected by the cross belting 41, receiving their motivation from pulley 35.

Pulley 35 has secured thereto driving pulley 34 which is connected by belting 42 to the driven pulley 43 connected to a driving shaft 44. On the said driving shaft, the pulley 47 is caused to drive the pulley 48 secured to the shaft 45 so that the shafts 44 and 45 rotate in opposite directions and cause the intermediate feed rolls 28 to be rotated in that direction by virtue of a cross belt 49 interconnecting and providing transmission for pulleys 47 and 48. On the said driving shaft 44, a driving pulley 46 is connected to a driven pulley 51 mounted on a shaft 54 and connected by the transmission belt 50. The shaft 54 and its mating shaft 55 serve to mount thereon rotatably casing stripping rolls or means 29 which are held securely in place by fastening means 57.

The shaft 54 is connected to the shaft 55 to transmit motion thereto by means of pulleys 52 and 53 mounted respectively on shafts 54 and 55 and interconnected by the cross belt 56.

It is to be noted that the initial feeding means 27 will rotate in the direction of the arrows shown contra to one another, and likewise for the intermediate rolls, as well as for the casing stripping rolls. The casing stripping rolls are provided with suction and pressure by means of the pumping unit 58 having its exhaust connected to the conduit 59 and its intake connected to the conduit 60, the same being connected to the casing stripping rolls 29 so as to effectuate alternate suction and slight air pressure in order to grip the casing for stripping purposes, and ultimately release the bisected stripped portion 24 so that it may be discarded.

When the process is completed, the stripped casing 24 will be discarded on either side of the casing stripping means and caught in suitable receptacles therefor not illustrated, whereas the skinless frankfurter 23 will pass through the mouth 25 onto the reception table 26 from which it is sent to the aforementioned banding machine; the stripped casing 24 is dropped into the discard.

The pneumatic stripping means 29 is best illustrated in Figs. 4 to 8, and it is indicated that it consists of a central hub portion or section 73. The said central hub 73 is connected and secured rather firmly to a resilient outer section subdivided into a number of resilient smaller sections 70, by virtue of the slotted portions 71, so as to permit the sausage casing stripping means 29 to be brought as closely together as possible and to secure sufficient purchase and traction on the frankfurter material 18 which may be damp, moist, or slippery to a certain extent.

The resilient section is secured to the central hub section 73 by virtue of keys 74 engaging suitable keyways to hold the same firmly in proper relationship.

The central hub section 73 is provided with a multiplicity of ports 78, radially positioned throughout its entire circumferential portion, the same merging with a like number of ports 82 molded or formed into the resilient section of the casing stripping means 29, which is, incidentally, provided with the "V-shaped" formation 72 in order to even better engage the slippery frankfurters and cause the feeding thereof through the machine.

It should also be noted that the casing stripping means 29 is mounted rotatably by virtue of its core means 73 provided with the ports 78, having the cored opening 76 therein mounted on the valve means 75 which is provided with a shoulder portion 77, defining an opening 77' so that driving pin connecting means 132 could be secured to the central hub means 73 and the compound pulley means 51 and 52 which are used for driving the combined casing stripping rolls 29 by virtue of belting 52 and 56 heretofore mentioned.

Figures 5, 6, 7:
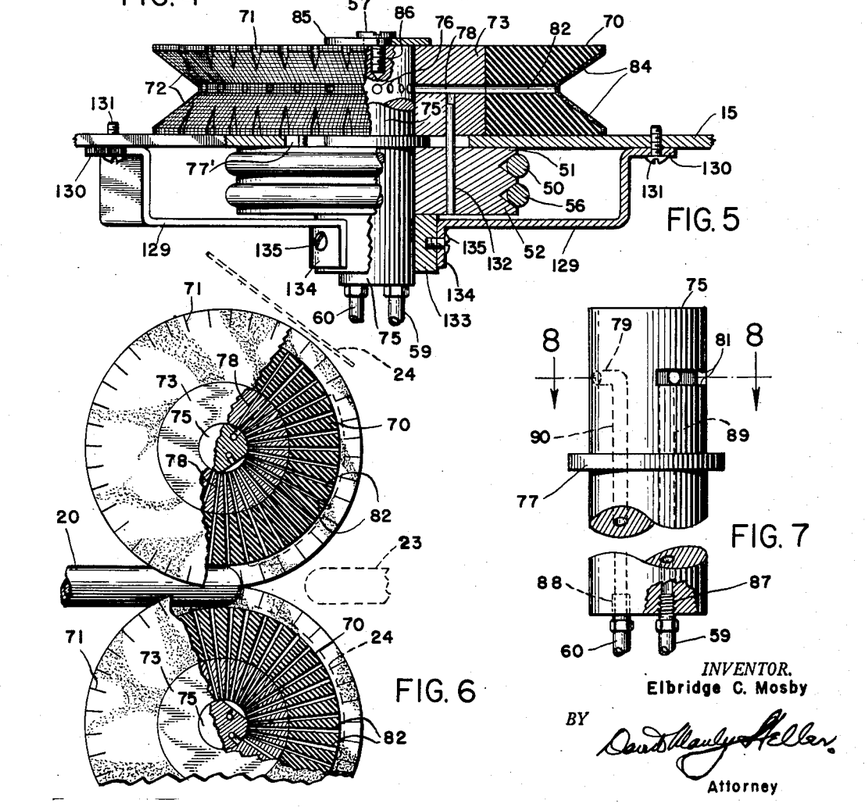
Fig. 5 is a front view of Fig. 4.
Fig. 6 is a composite view looking down on the stripping rolls preparatory to feeding a frankfurter therethrough, and stripping the bisected casing therefrom, showing the frankfurter passing through stripped of its casing, the casing being discarded.
Fig. 7 is a view of the valve means on which the stripper means is rotatably mounted.
Figure 8:
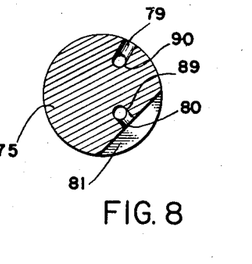
Fig. 8 is a cross-sectional view taken substantially on the line 8—8 of Fig. 7.

The lower section of the valve means 75 is provided with two threaded openings 87 and 88 in order to receive the connecting nipples of conduits 59 and 60 which connect ports 89 and 90 terminating in the port connections 79 and 80, the cutaway portion 81 radially of the valve 75 is so made as to permit the port 89 to align itself alternately or progressively with a number of ports 78. The said connection is connected to the suction end of the intake of the pump 58, whereas the port 90 is connected to the exhaust thereof, so that the suction will be effected through a number of radial ports 78 and 82, whereas the pressure action will be effected through one port at a time as the port 79 radially aligns with the various ports 78 and 82 so as to gently blow off the bisected casing section 24 heretofore referred to.

Figure 4:
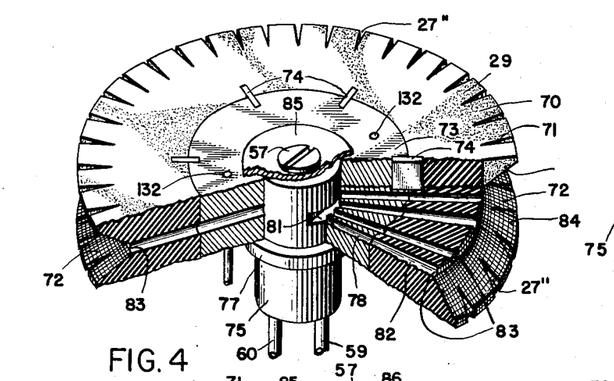
Fig. 4 is a perspective view showing in enlarged delineation, with certain portions thereof cut away, the specific structure of the casing stripping means.

The "V-shaped" configuration 72 of the casing stripping rolls or means 29 is covered by a very fine and suitable resilient mesh 84 so as to prevent the stripped casing 24 from being sucked into the mouths 83 of the ports 78 or 82.

It will also be noted in Fig. 1 that the conduits 59 and 60 are provided with cross conduits 61 and 62 to be likewise connected to the valve structure to interconnect and actuate the valve structure to both casing stripping means 29 simultaneously so that the two pieces of bisected casing 24 will be firmly pulled off, gently discarded, and the skinless frankfurter 23 fed onto the receiving platform 26.

The casing stripping rolls 29 are held in place by means of bearing washers 85 and the enlarged head screw 57 having its threaded portion 86 secured to the threaded opening in the valve 75, which is broken away as shown in Fig. 5.

The casing stripping means is rotatably mounted and supported on the table 15 by virtue of the bracket means 129 having the ends 130 secured by the screws 131 to the supporting table 15, their other termini are bent as indicated at 134 and secured by screws 135 to a suitable housing 133, in which the valve 75 is firmly and rigidly supported against rotation, the casing stripping means 29 rotating thereupon.

Figures 9, 10, 11, 12, 13:
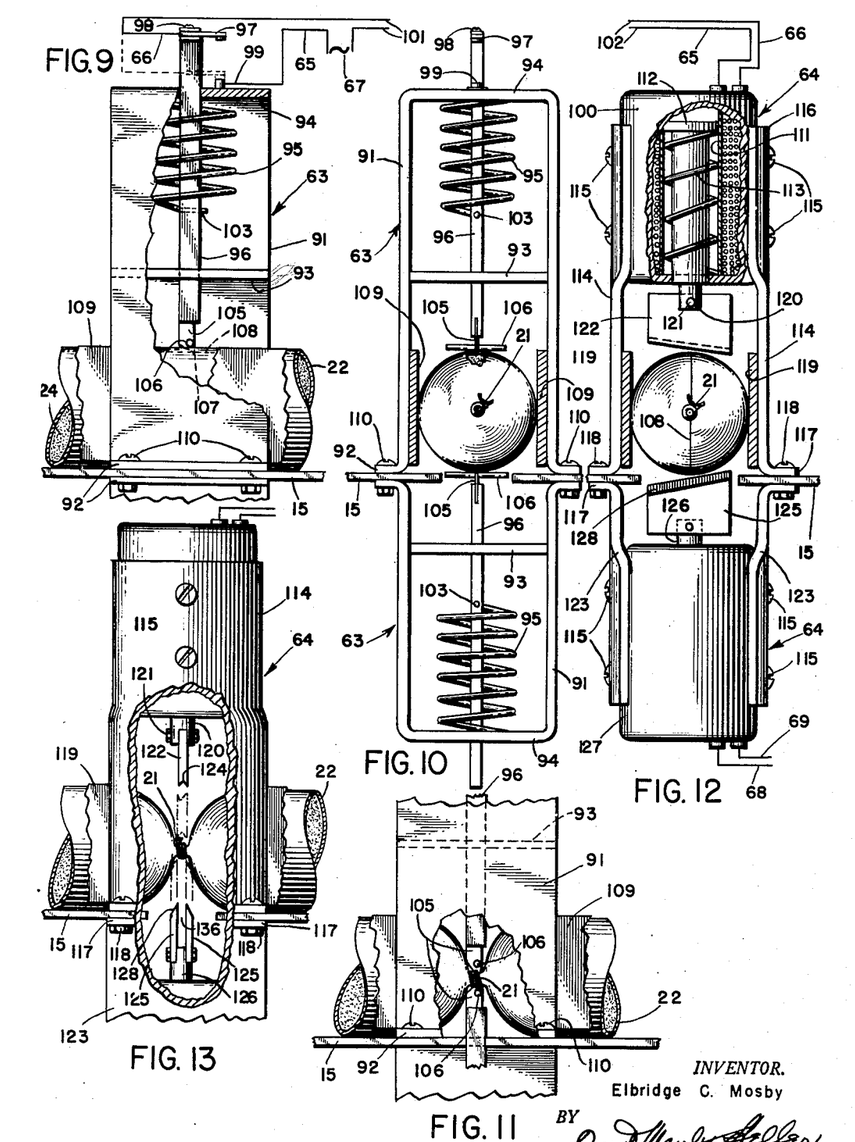
Fig. 9 is a view, with certain portions thereof broken away, showing as well the electrical connection of the casing bisecting means.
Fig. 10 is a side view of Fig. 9, showing the arrangement of the dual knife structure effectuating the bisection of the casings.
Fig. 11 is a side view similar to Fig. 10 showing the bisecting knives in their closest position when the follower causes them to occupy the position at the point of linkage between individual frankfurters at which time the circuit is closed effectuating instantaneous action of the guillotine on frankfurters positioned one or more links ahead thereof.
Fig. 12 is a view of the guillotine means which is actuated in synchronism with the casing bisecting means to effectuate the separation of each individual frankfurter link from its linked formation.
Fig. 13 is a side view of Fig. 12.

The detailed structure of the casing bisecting or slitting means is illustrated in Figs. 9, 10 and 11. The guillotine means is illustrated in Figs. 12 and 13. With reference to the casing bisecting means, generally designated 63, it consists of an enclosure 91 having a top 94 and a bottom 93 defining a spring housing to confine the spring 95 therein. The said spring is connected to the knife support means 96 at 103 which has secured thereto a suitable knife blade 105 being pointed at 107 in order to penetrate the casing 22 and slightly cut into the frankfurter 24 as indicated on the cutting line 108 which may be set to be a few thousandths of an inch deeper than the thickness of the frankfurter casing 22, the depth of the cut being controlled by the positioning of the pins or roller type gauge 106 positioned in the knife blade at the proper point. The said gauge 106 is very small in circumference and of a length as indicated in Fig. 10 so that the same will contact tangentially the cylindrical configuration of the linked frankfurter material 18 and allow the cutting or bisecting knives 105 above and below to ride along the configuration of the linked material 19, dropping into the constrictions 21 as indicated in Fig. 11 in order to slit the entire longitudinal peripheral section of the entire length of material 18, bisecting the casing into two parts which still adhere to the frankfurters 24 confined therebetween.

The frankfurter material 18 is guided between suitable non-marring guide plates 109 so that the same will be confined and not be displaced laterally as indicated in Fig. 10.

The units 63 are provided with suitable ear portions 92 so that the same may be secured by virtue of screws 110 and suitable nuts therefor to the table 15.

The upper knife 96 is provided with an insulating connection and secured to a contact 97, having one terminal thereof connected by a circuit 66 to a source of supply 67. The circuit terminals 101 are open inasmuch as they are connected to the circuit terminals 102 on the circuits 66 and 65 of the electrical source of supply 67. Another terminal 99 is connected to the top 94 of the casing slitting or bisecting means 63, and when the knife 105 drops down to the position indicated in Fig. 11, contacts 97 and 99 close the circuit thereby actuating the electromagnets 100 and 127 illustrated in Figs. 12 and 13.

The contact 97 is secured by a screw 98. The circuit is completed to the electromagnets 99, which are furnished at top and bottom of the guillotine unit, generally designated 64, the upper unit being provided with guide sections 119 so as to prevent lateral displacement of the material 18 and the bisected and still encased frankfurters which indicate in Figs. 12 and 13 that the bisection line 108 and the restriction 21 with its confining thread which is to be cut out of the assemblage at the same time separating the individual frankfurters which have priorly had their casings bisected.

The structure illustrated in Figs. 12 and 13 consists of a pair of brackets 114, provided with rounded or accurately formed holding portions 116 for securing the electromagnets 100 and 127 thereto by virtue of fastening such as screws 115. The brackets are provided with ears 117 which are secured by virtue of screw and nut means 118 to the table 15. The electromagnet 100 has a suitable number of windings which are as indicated connected to the circuits 65 and 66 and have a core 111, centrally thereof, in which is mounted the magnetic core 100' which has a reduced section 120 and fastening means 121 for securing the male guillotine knife 122 which is cut at an angle as indicated, and which has a central angular section 124 in order to facilitate grinding the same, yet maintaining the rigid measurements thereof so as to fit between the dual or female mating guillotine section 125 secured to the extension 126. The core 100 has an enlarged head 112 in order to hold the spring 113 in captivity.

It will be noted that the thickness of the male guillotine 122 is such that it will fit snugly in the spaces of the female guillotine 125, and the female guillotine is so cut angularly at 128 defining the intermediate opening slot 136 in order to guide firmly the male guillotine 122. Thus the linked section with its confining cord is completely cut away and may be drawn off pneumatically or allowed to drop off into a receptacle for collecting the same. The female guillotine 125 is secured to the extension 126 of the magnetic core of the lower magnet 127. The lower magnet 127 is held in place by brackets 123 held by screws and nuts 118.

Thus the operation in an abridged statement consists primarily of feeding a length of cooked and processed frankfurter material 18 through initial feeding rolls and intermediate feeding rolls guiding the same through casing bisecting means which operate on the peripheral configuration of the material 18, bisecting the outermost peripheral portions as well as the constricted portions and ultimately feeding the frankfurters through the intermediate rolls toward guillotine means positioned at a suitable distance, which cuts out the restricted portion and severs the individual frankfurters preparatory to their subsequent and ultimate feeding through the frankfurter stripping means 29, delivering the skinless frankfurter 23, which may ultimately be passed to the banding operation as heretofore described.

The applicant wishes to stress that an important feature of his invention is the combined suction and pressure for firmly removing the casings, which have first been bisected, from the frankfurter and the gentle disposal thereof through slight pressure means, releasing the same from the casing stripping means.

The material 18, in passing through the initial feeding rolls, the intermediate feeding rolls which have positioned therebetween the casing bisecting means 63, cause the entire casing to become bisected inasmuch as the knives thereof are set in gauging relationships to penetrate and cut slightly, a few thousandths of an inch, beyond the thickness of the synthetic substance used in the encasement of frankfurters for processing.

Then subsequently passing the frankfurters with proper synchronized timing relationship, the casing bisecting means 63 actuates through electrical connection the guillotine means for cutting out the restriction 21 and severing the individual frankfurter with its confining enclosure, namely the bisected synthetic casing, so that the same ultimately is fed through the casing stripping means which firmly strips the casing, gently disposes of it, and simultaneously feeds the skinless frankfurter to a receiving station preparatory to further operations that may be necessary.

While I have illustrated and described what I now regard as the preferred form of construction, it is to be understood that I expressly reserve the right to make all such changes and modifica- Having thus disclosed and revealed my invention, what I claim as new and desire to secure by Letters Patent is:

1. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, and stripper feed means rotatably mounted on said support means in front of the said guillotine means stripping a severed frankfurter by virtue of pneumatic means and disposing of the bisected casing by slight pressure.

2. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, and pump means having its exhaust line connected to the said suction port and having its pressure line connected to the said exhaust port.

3. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, and stripper feed means rotatably mounted on said support means in front of the said guillotine means stripping a severed frankfurter by virtue of pneumatic means and disposing of the bisected casing by slight pressure, the said feed roll means and the said stripper feed means being made of resilient material having peripherally disposed "V-grooved" portions subdivided into a multiplicity of yieldable sections by virtue of radially positioned slotted portions.

4. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, the said feed roll means and the said stripper feed means being made of resilient material having peripherally disposed "V-grooved" portions subdivided into a multiplicity of yieldable sections by virtue of radially positioned slotted portions.

5. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said suport means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, and pump means having its exhaust line connected to the said suction port and having its pressure line connected to the said exhaust port, the said stripper feed means being provided with a multiplicity of radially positioned ports which align alternately with the said suction port and the said exhaust port of the said valve means.

6. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, and stripper feed means rotatably mounted on said support means in front of the said guillotine means striping a severed frankfurter by virtue of pneumatic means and disposing of the bisected casing by slight pressure, the said feed roll means and the said stripper feed means being made of resilient material having peripherally disposed "V-grooved" portions subdivided into a multiplicity of yieldable sections by virtue of radially positioned slotted portions, the said stripper feed means being provided with a multiplicity of radially positioned ports which align alternately with the said suction port and the said exhaust port of the said valve means.

7. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, and pump means having its exhaust line connected to the said suction port and having its pressure line connected to the said exhaust port, the said feed roll means and the said stripper feed means being made of resilient material having peripherally disposed "V-grooved" portions subdivided into a multiplicity of yieldable sections by virtue of radially positioned slotted portions, the said stripper feed means being provided with a multiplicity of radially positioned ports which align alternately with the said suction port and the said exhaust port of the said valve means.

8. Mechanism for stripping the casing from frankfurters and the like, comprising support means, resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, and resilient mesh means secured to the peripheral portions of the said stripper feed means in congruent relationship therewith.

9. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, and resilient mesh means secured to the peripheral portions of the said stripper feed means in congruent relationship therewith.

10. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, the said feed roll means and the said stripper feed means being made of resilient material having peripherally disposed "V-grooved" portions subdivided into a multiplicity of yieldable sections by virtue of radially positioned slotted portions, and resilient mesh means secured to the peripheral portions of the said stripper feed means in congruent relationship therewith.

11. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, the said feed roll means and the said stripper feed means being made of resilient material having peripherally disposed "V-grooved" portions subdivided into a multiplicity of yieldable sections by virtue of radially positioned slotted portions, and resilient mesh means secured to the peripheral portions of the said stripper feed means in congruent relationship therewith.

12. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, the said stripper feed means being provided with a multiplicity of radially positioned ports which align alternately with the said suction port and the said exhaust port of the said valve means, and resilient mesh means secured to the peripheral portions of the said stripper feed means in congruent relationship therewith.

13. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, the said feed roll means and the said stripper feed means being made of resilient material having peripherally disposed "V-grooved" portions subdivided into a multiplicity of yieldable sections by virtue of radially positioned slotted portions, the said stripper feed means being provided with a multiplicity of radially positioned ports which align alternately with the said suction port and the said exhaust port of the said valve means, and resilient mesh means secured to the peripheral portions of the said stripper feed means in congruent relationship therewith.

14. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, the said feed roll means and the said stripper feed means being made of resilient material having peripherally disposed V-grooved portions subdivided into a multiplicity of yieldable sections by virtue of radially positioned slotted portions, the said stripper feed means being provided with a multiplicity of radially positioned ports which align alternately with the said suction port and the said exhaust port of the said valve means, and resilient mesh means secured to the peripheral portions of the said stripper feed means in congruent relationship therewith.

15. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, transmission means interconnecting the said resilient feed roll means and the said stripper feed means, and prime mover means connected to the said transmission means.

16. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust line connected to the said suction port and having its pressure line connected to the said exhaust port, transmission means interconnecting the said resilient feed roll means and the said stripper feed means, and prime mover means connected to the said transmission means.

17. Mechanism for stripping the casing from frankfurters and the like, comprising support means resilient feed roll means rotatably mounted on said support means and adapted to feed a chain of processsed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically actuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, the said feed roll means and the said stripper feed means being made of resilient material having peripherally disposed "V-grooved" portions subdivided into a multiplicity of yieldable sections by virtue of radially positioned slotted portions, transmission means interconnecting the said resilient feed roll means and the said stripper feed means, and prime mover means connected to the said transmission means.

18. Mechanism for stripping the casing from frankfurters and the like, comprising support means resilient feed roll means rotatably mounted on said support means and adapted to feed a chain of processed frankfurters, casing bisecting means disposed in superimposition and in an imaginary geometric plane lying equidistantly from the axes of the said feed roll means, the said casing bisecting means being provided with follower means adapted to ride on a length of linked frankfurter material passing therebetween, electro-magnetically acuated guillotine means mounted on said support means for severing frankfurters positioned with respect to the said casing bisecting means a distance equivalent to the space between adjacent link portions in the said linked frankfurter material, electrical switch means on the said casing bisecting means adapted to close an electrical circuit when the said follower means drops into a link portion, an electrical circuit connecting the said electrical switch means and the said electro-magnetically actuated guillotine means, stripper feed means rotatably mounted on said support means in front of the said guillotine means stripping a severed frankfurter by virtue of pneumatic means and disposing of the bisected casing by slight pressure, valve means for mounting the said stripper feed means rotatably thereon, the said valve means being provided with a suction port and an exhaust port on its peripheral surface, pump means having its exhaust lines connected to the said suction port and having its pressure line connected to the said exhaust port, the said feed roll means and the said stripper feed means being made of resilient material having peripherally disposed V-grooved portions subdivided into a multiplicity of yieldable sections by virtue of radially positioned slotted portions, transmission means interconnecting the said resilient feed roll means and the said stripper feed means, and prime mover means connected to the said transmission means.

ELBRIDGE C. MOSBY.

References Cited in the file of this patent

UNITED STATES PATENTS

| Number | Name | Date |
| --- | --- | --- |
| 2,434,316 | Golden et al. | Jan. 13, 1948 |
| 2,463,157 | Deitrickson | Mar. 1, 1949 |
| 2,636,213 | Fedevich | Apr. 28, 1953 |